United States Patent [19]

Stephenson

[11] 4,326,431
[45] Apr. 27, 1982

[54] VARIABLE-SPEED TRANSMISSION DEVICE WITH POSITIVE ACTION

[76] Inventor: Roger Stephenson, Box 364, Rte. 10, Columbia, Mo. 65201

[21] Appl. No.: 130,987

[22] Filed: Mar. 17, 1980

[51] Int. Cl.³ .............................................. F16H 21/14
[52] U.S. Cl. .......................................... 74/63; 74/397; 74/415
[58] Field of Search ................ 74/380, 393, 395, 397, 74/63, 112, 190, 415, 390, 396; 474/49

[56] References Cited

U.S. PATENT DOCUMENTS

| | | | |
|---|---|---|---|
| 592,726 | 10/1897 | Edge | 19/105 |
| 1,576,891 | 3/1926 | Allen | 192/46 |
| 2,911,846 | 11/1959 | Platt | 74/426 |
| 3,486,597 | 12/1969 | Carlton | 192/46 |
| 3,491,604 | 1/1970 | Levi | 74/63 |

FOREIGN PATENT DOCUMENTS

| | | | |
|---|---|---|---|
| 480789 | 2/1938 | United Kingdom | 74/63 |
| 946682 | 1/1964 | United Kingdom | 74/112 |

Primary Examiner—C. J. Husar
Assistant Examiner—Conrad Berman
Attorney, Agent, or Firm—Lowe, Kokjer, Kircher, Wharton & Bowman

[57] ABSTRACT

This invention deals with a variable-speed transmission device which provides a positive or mechanical connection between its drive and driven shafts. The transmission device of the present invention is comprised of a drive wheel and a driven wheel which are positioned adjacent to each other in a generally parallel relationship. This device also includes means for transferring the rotary motion of the drive wheel to the driven wheel such that the speed of the driven wheel relative to the drive wheel is controlled by the position of the driven wheel relative to the drive wheel. In this way, the transmission device of the present invention is capable of producing within a finite range of gear ratios an infinite number of different gear ratios to thereby control the speed of its driven shaft within very small limits.

8 Claims, 10 Drawing Figures

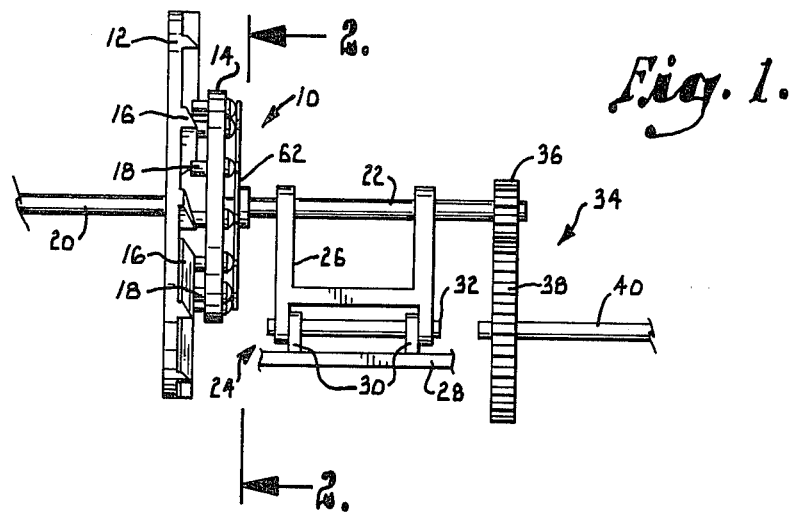
Fig. 1.
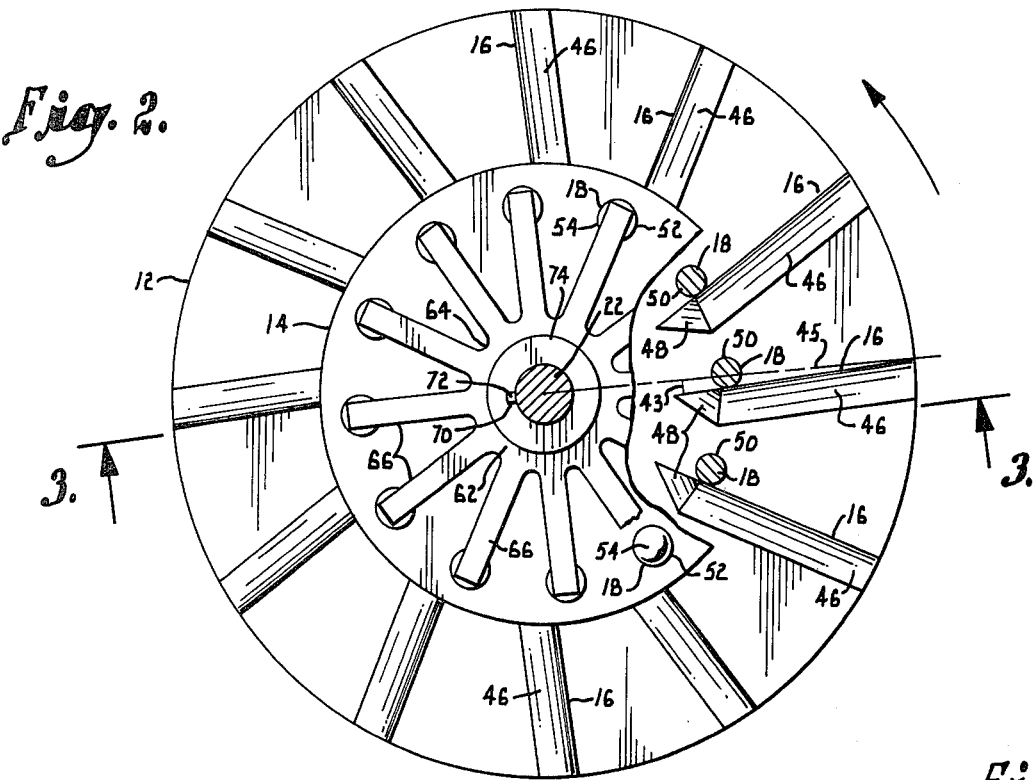
Fig. 2.
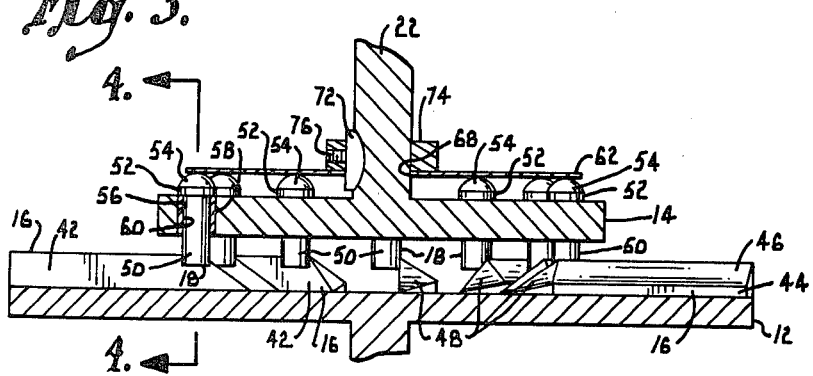
Fig. 3.
Fig. 4.

VARIABLE-SPEED TRANSMISSION DEVICE WITH POSITIVE ACTION

BACKGROUND AND BRIEF DESCRIPTION OF THE INVENTION

This invention relates in general to a variable speed transmission device which provides a mechanical or positive connection between its drive and driven shafts. The transmission device of the present invention is capable of producing within a finite range of gear ratios an infinite number of gear ratios.

Many different types of transmission devices are presently available. All of these prior art devices, however, have a number of inherent disadvantages which significantly limit their use and effectiveness.

A transmission device is quite simply an apparatus for providing one or more different gear or drive ratios between its input and output shafts. In particular, a transmission device is typically operable to either increase the speed of its output shaft relative to the speed of its input shaft or vice versa. Heretofore, these speed changes have been effectuated by means of transmission devices comprising either gear trains or friction drives.

A gear train is normally comprised of a plurality of gears which are arranged to interact in order to transmit motion from an input shaft to an output shaft. The ratio between the speed of the input shaft and the speed of the output shaft is determined by the number of gears in the train, the number of teeth on each gear and the arrangement of the gears with respect to each other. In this type of transmission device, the gears in the train physically engage each other to provide a physical or positive connection between the input and output shafts. A physical or positive connection between the input and output shafts is highly desirable because it prevents the gear train from slipping during high power applications. Gear trains, however, are extremely limited in use because they are capable of producing only a single gear ratio between their input and output shafts. Accordingly, gear trains are not very versatile and can only be used in limited applications.

To overcome this disadvantage, many transmission devices are comprised of several gear trains and means for switching between the various gear trains to thereby provide a larger number of gear or drive ratios between the device's input and output shafts. The number of different gear ratios capable of being produced by such a transmission device, however, is still rather limited making it impossible to control the output speed of the output shaft within very small limits. Another disadvantage associated with transmision devices having changeable gear trains is that the device is normally of a fairly complex mechanical design. In particular, the device must be equipped with a clutch mechanism for disengaging the device from its corresponding source of power when the gear train is being changed. Such a device must also be equipped with mechanical means for changing from one gear train to another. Accordingly, transmission devices having changeable gear trains are complex in design, expensive to build and costly to maintain.

A friction drive, on the other hand, is typically comprised of a circular driving disc having its contacting face covered with a suitable friction material such as rubber, leather or brake lining and a driven wheel having a suitable material attached to its outer edge. The driving disc and driven wheel are normally positioned perpendicular to each other such that the outer edge of the driven wheel is in contact with the face of the driving disc. In this position, the rotational motion of the driving disc is imparted to the driven wheel with the rotating speed of the driven wheel being controlled by the position of the wheel relative to the center axis of the driving disc. As the driven wheel is moved along the radius of the driving disc, it's speed of rotation varies with position. When the distance from the center axis of the driving disc to the point of contact between the driven wheel and the face of the driving disc is equal to the radius of the driven wheel, the gear ratio between the input and output shafts is 1:1. As the driven wheel is moved closer to the center axis of the driving disc, the gear ratio is correspondingly reduced. The gear ratio, however, increases as the driven wheel is moved away from the center axis of the driving disc. As a result, this type of transmission device is capable of providing within set limits an infinite number of stepless ratio changes which allow the output speed of the output shaft to be controlled within very small limits.

While a friction drive is capable of producing a large range of ratio changes, the usefulness of this device is severely limited because it does not provide a physical or positive connection between its input and output shafts. In other words, the motion of the input shaft is transferred to the output shaft by means of the frictional contact between the driving disc and the driven wheel. Accordingly, this type of transmission device is not suitable for use in large power applications because of the power losses and wear that accompany slippage.

The transmission device of the present invention, however, exhibits the desirable features of both of these prior art transmission devices. In particular, the transmission device of the present invention is capable of producing within a finite range of gear ratios an infinite number of ratio changes to thereby control the speed of the output shaft within small limits, as can the prior art transmission devices comprised of friction drives. In addition, this transmission device provides a positive or mechanical connection between its input and output shafts to thereby make this device acceptable for use in large power applications, as are the presently known transmission devices utilizing gear trains. Accordingly, the transmission device of the present invention incorporates the desirable features of both of the prior art transmission devices.

The transmission device of the present invention is comprised of a pair of circular wheels having different diameters. In the preferred embodiment of the invention, the larger wheel is designated the drive wheel and has a plurality of movement imparting bars mounted on its drive face in a generally radial configuration. The other wheel is designated the driven wheel and is equipped with a plurality of cylindrically shaped movement receiving pegs which are mounted to this wheel such that a portion of each peg protrudes outward from the drive face of the wheel. These two wheels are positioned adjacent to each other such that the movement receiving pegs of the driven wheel are capable of physically engaging the movement imparting bars of the drive wheel. In this way, the movement imparting bars and movement receiving pegs interact to transmit rotational motion from the drive wheel to the driven wheel, with the speed of the driven wheel being determined by the position of the driven wheel relative to the drive wheel. By varying the relative position of these two wheels, the gear ratio between the device's input and output shafts is correspondingly changed to thereby provide within set limits an infinite range of stepless ratio changes which allow the output speed of the output shaft to be controlled within very small limits. Since the motion of the drive wheel is imparted to the driven wheel through the physical contact between the movement imparting bars on the drive wheel and the movement receiving pegs on the driven wheel, this device provides a physical or positive connection between its input and output shafts thereby making it suitable for use in connection with large power loads.

It is therefore an object of the present invention to provide a variable-speed transmission device which provides a mechanical or positive connection between its input and output shafts.

Another object of the present invention is to provide a variable-speed transmission device which is capable of producing within a finite range of gear ratios an infinite number of different gear ratios to thereby allow the output speed of the output shaft to be controlled within very small limits.

A further object of the present invention is to provide a variable-speed transmission device of the character described which is capable of changing the gear ratio between its input and output shafts while the device is operating under a load.

An additional object of the present invention is to provide a variable-speed transmission device of the character described which is capable of being used in connection with large power loads.

It is a further object of the present invention to provide a variable-speed transmission device of the character described which is simple to operate.

It is a further object of the present invention to provide a variable-speed transmission device of the character described which is simple and economical to construct and is reliable in operation.

Other and further objects of the invention together with the features of novelty and apurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 1 is a side elevational view of a variable speed transmission device constructed according to a preferred embodiment of the present invention;

FIG. 2 is a cross-sectional view on an enlarged scale taken generally along line 2—2 of FIG. 1 in the direction of the arrows, with portions broken away for the purposes of illustration and showing the device in a 1:1 gear ratio;

FIG. 3 is a cross-sectional view taken generally along line 3—3 of FIG. 2 in the direction of the arrows;

FIG. 4 is a sectional view on an enlarged scale taken generally along line 4—4 of FIG. 3 in the direction of the arrows;

Figure 5:
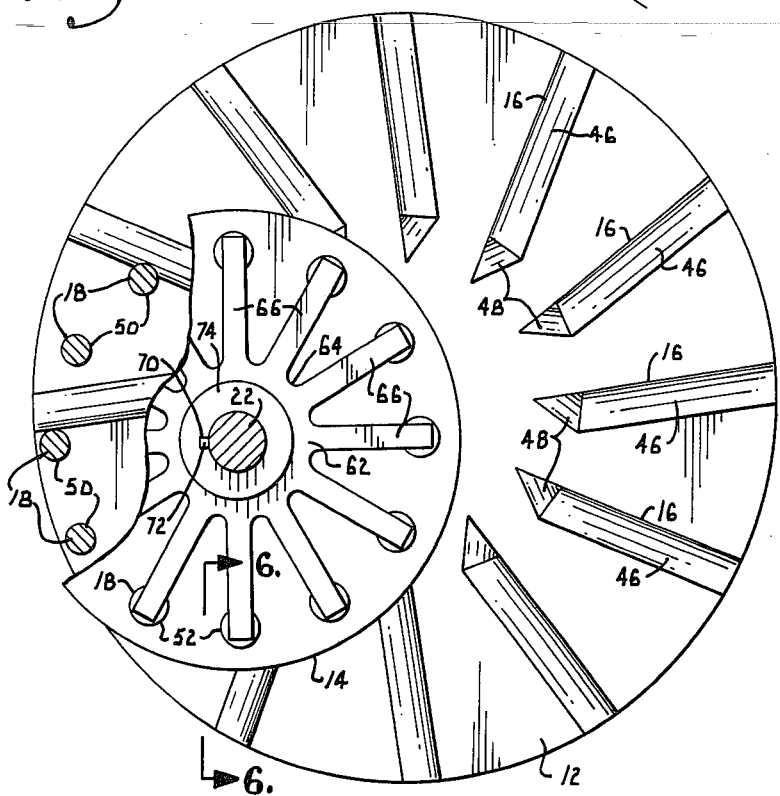
FIG. 5 is a cross-sectional view on an enlarged scale taken generally along line 2—2 of FIG. 1 in the direction of the arrows with portions broken away for the purposes of illustration showing the transmission device of the present invention generally in a 1:2 gear ratio.

Referring now to the drawings in detail and initially to FIG. 1, numeral 10 generally designates a variable speed transmission device constructed in accordance with a preferred embodiment of the present invention. This device is basically comprised of a drive wheel 12 having a circular face and a driven wheel 14 having a circular face and a smaller diameter than the drive wheel. The drive wheel has a plurality of movement imparting bars such as 16 mounted on the face thereof. The movement imparting bars are arranged to engage a plurality of movement receiving pegs such as 18 which are yieldably mounted to the driven wheel to project outward therefrom. As shown in this figure, the drive wheel is positioned adjacent to the driven wheel in a generally parallel orientation so that the movement imparting bars are capable of interacting with the movement receiving pegs to physically transfer motion from the drive wheel to the driven wheel. As a result, the transmission device of the present invention is capable of providing a positive or physical connection between its drive wheel and driven wheel.

Drive wheel 12 is carried by a drive shaft 20 which is attached to the drive wheel at its center axis. Drive shaft 20 is in turn coupled with a prime mover (not shown) which is capable of imparting rotational movement to the shaft. The driven wheel 14, on the other hand, has a driven shaft 22 attached to this wheel at its center axis. The driven shaft is carried by a support structure 24 comprising a U-shaped support bracket 26 which is pivotally coupled with a support surface 28 by means of a pair of protruding flanges 30 and a pivot pin 32. It should be noted at this time that support structure 24 is merely illustrative and does not pertain to the essence of this invention. In fact, this support structure may be replaced by any other type of support structure which is capable of moving the driven wheel relative to the drive wheel such that both of these wheels are maintained in parallel planes which are spaced uniformly apart.

The driven shaft is shown in FIG. 1 operably coupled with a reduction gear train 34 comprising gears 36 and 38. Gear 36 is attached to driven shaft 22 while gear 38 is coupled with an output shaft 40 which is arranged to impart rotational motion to a suitable load (not shown herein).

Reference is now made to FIGS. 2-5 for a more detailed description of the movement imparting bars 16. As shown in these figures, the movement imparting bars are uniformly spaced about the center axis of the drive wheel in a generally radial configuration. Each of the movement imparting bars is constructed to have a trapezoidal cross section (as shown in FIG. 4) with a peg engaging lateral surface 42, a lateral side surface 44 and an inclined face 46. The inner edge of each movement imparting bar is also tapered as indicated at 48.

In the preferred embodiment of the invention shown herein, the movement imparting bars are not mounted to the face of the drive wheel in a perfectly radial position but rather are offset from a radial position a slight amount to thereby provide a smoother transfer of contact between the movement imparting bars and the movement receiving pegs. As shown in FIG. 2, each bar is mounted onto the face of the drive wheel such that the peg engaging lateral surface 42 of the bar forms an offset angle 43 with an imaginary radial line 45 which extends from the center of the drive wheel to the outer edge of the engaging lateral surface.

Reference is now made to FIGS. 2-6 for a more detailed description of the movement receiving pegs. The movement receiving pegs are uniformly distributed about the outer periphery of the driven wheel in a circular configuration. While the number of pegs mounted onto the driven wheel may vary, it has been determined that the number of pegs should be a whole number multiple of the number of movement imparting bars mounted on the face of the drive wheel.

As shown in FIGS. 3 and 4, each of the pegs is constructed to have a cylindrically shaped body portion 50 and an enlarged head portion 52 with a curved upper surface 54. Each peg is mounted to the driven wheel by positioning it within a corresponding positioning hole in the wheel such that a portion of the body portion of the peg protrudes outward from the face of the driven wheel towards the drive wheel. A bushing 58 is fitted within each positioning hole 56 to reduce the friction between the outer surface of the peg and inner surface of the hole. Each bushing is equipped with a hollow inner channel 60 having an inner diameter slightly larger than the outer diameter of body portion of its corresponding peg to allow for free rotational and axial movement of the peg within the channel.

Returning to FIGS. 1-6, the pegs are maintained in a protruding position by means of a biasing means 62. Biasing means 62 is comprised of a flat piece of metal having a central hub portion 64 and a plurality of extending arms such as 66 which act as leaf springs. The arms project radially outward from the hub portion of the biasing means, with one arm corresponding with each peg. A hole 68 is provided in the hub portion of the biasing means to mount the biasing means onto driven shaft 22. A slot 70 is defined in the internal surface of hole 68. This slot is arranged to receive a spline 72 to lock the biasing means in place on the driven shaft such that each arm of the biasing means is positioned to contact the curved upper surface of a corresponding peg. A locking collar 74 is used to retain the biasing means in place on the driven shaft. The locking collar is provided with a locking screw 76 for securing the collar in place on the driven shaft. In this arrangement, each of the extending arms acts on its corresponding peg to force the enlarged head of the peg against the back surface of the driven wheel thereby maintaining the peg in a protruding position. The arms, however, are resilient enough to allow the pegs to move axially within their positioning holes. In this way, the movement receiving pegs are yieldably mounted onto the driven wheel of the device.

It should be noted at this time, however, that this particularly biasing means is only shown for the purpose of illustration and is only one of several different arrangements which may be incorporated into the device. These alternate biasing means will be readily apparent to those of ordinary skill in the art and may be comprised of different spring arrangements or more complicated hydraulic or pneumatic systems.

In operation, the drive wheel and driven wheel are positioned adjacent to each other in a generally parallel relationship. These wheels are positioned close enough to each other to allow for physical engagement between the movement imparting bars on the drive wheel and the movement receiving pegs on the driven wheel. As the drive wheel rotates, one or more of the movement imparting bars is always in physical contact with a projecting peg to thereby transmit the rotary motion of the drive wheel to the driven wheel.

In this device, the gear ratio between the drive wheel and the driven wheel is determined by the relative position of the center axis of the drive wheel with respect to the center axis of the driven wheel. In particular, the gear ratio between the drive shaft 20 and the driven shaft 22 is 1:1 whenever the center axis of the drive wheel is colinear with the center axis of the driven wheel. The gear ratio between the drive shaft and the driven shaft may be changed, however, by simply moving the center axis of the driven wheel out of alignment with the center axis of the driven wheel. By moving the driven wheel relative to the drive wheel, the effective radius of the drive wheel is varied to thereby produce a corresponding change in the gear ratio. The effective radius of the drive wheel corresponds to the distance from its center axis to the point where the velocity of the pegs is perpendicular to a radial line through that point. The physical design and operation of the transmission device shown in this embodiment of the invention limits the operation of this device to a maximum gear ratio of 1:2. The device, however, is capable of obtaining any gear ratio within the range of gear ratios from 1:1 to 1:2. Accordingly, the transmission device of the present invention is capable of providing within a finite range of gear ratios an infinite number of stepless ratio changes which allow the output speed of the output shaft to be controlled within very small limits.

When the center axis of the drive wheel is colinear with the center axis of the driven wheel (as shown in FIG. 2), the device is operating in a 1:1 ratio. In this configuration each movement imparting bar is in physical contact with a corresponding movement receiving peg to thereby cause the driven wheel to move in unison with the drive wheel.

When the center axis of the driven wheel is not aligned with the center axis of the drive wheel (as shown in FIG. 5), the effective radius of the drive wheel is changed thereby producing a corresponding change in the gear ratio. In this configuration, a contact cycle is initiated when the peg engaging lateral face of a first movement imparting bar comes in contact with a first movement receiving peg. The phrase "contact cycle" as used herein refers to the period of time during which the first movement imparting bar is in contact with the first movement receiving peg. This contact between the first movement imparting bar and the first movement receiving peg serves to transfer the rotary motion of the drive wheel to the driven wheel.

It should be noted that a peg moves along the peg engaging surface of the bar during the course of a contact cycle and that the speed of the driven wheel will therefore vary during the contact cycle. In general the speed of the driven wheel tends to increase during the early part of the contact cycle because of the increase and subsequent decrease of the effective radius of the drive wheel during the contact cycle. However, this effect is not large because a peg that is being driven at any point along the bar that is closer to the center of the drive wheel than the effective radius of the drive wheel will be moving in a slightly different direction than the point on the bar is moving. Thus the peg must be moving faster than the point on the bar it contacts because part of the motion of the peg is used to move along the bar.

Deceleration of the driven wheel during the latter part of the contact cycle allows for a second imparting bar to smoothly and easily come in contact with a second movement receiving peg thereby initiating a second contact cycle. As the driven wheel begins to accelerate during the second contact cycle, the first peg looses contact with the first bar. Thereafter, the movement of the drive wheel is transferred to the driven wheel solely by the physical contact between the second bar and the second peg.

Figure 6:
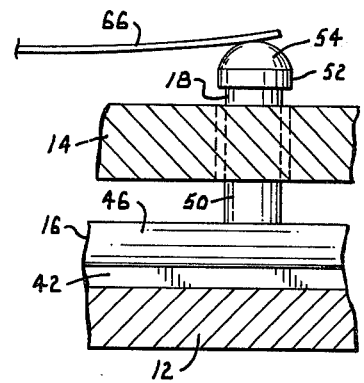
FIG. 6 is a fragmentary sectional view on an enlarged scale taken generally along line 6—6 of FIG. 5 in the direction of the arrows.

Since the drive wheel and the driven wheel are of different diameters, are often moving at different rates of speed and are often positioned such that their center axes are not aligned with each other, one or more of the movement receiving pegs will, as shown in FIG. 6, periodically intersect one or more of the movement imparting bars during the course of a normal contact cycle. As a result, one or more of the pegs on the driven wheel will, during the course of the drive cycle, occupy the same position as one or more of the bars on the drive wheel. To accomodate this intersection, the movement receiving pegs are yieldably mounted onto the driven wheel as discussed above. By yieldably mounting the movement receiving pegs onto the driven wheel, a peg is simply moved out of the way anytime it occupies the same position as a movement imparting bar thereby ensuring the smooth operation of the device.

To facilitate this interaction between the movement imparting bars and the movement receiving pegs, each of the bars is provided with an inclined face 46. The movement imparting bars are mounted onto the face of the drive wheel such that the inclined face of each peg faces in a direction opposite to the movement of the driven wheel. As a movement receiving peg comes in contact with the inclined face of a movement imparting bar, the peg climbs up the inclined face of the bar causing the peg to move laterally within the hollow inner chamber of its associated bushing. Displacement of a peg in this manner causes its corresponding arm of the biasing means to be resiliently displaced as shown in FIG. 6. Displacement of the extending arm in turn creates a force which tends to return the peg to its normal position wherein the enlarged head portion is maintained in contact with the back surface of the driven wheel.

The transmission device of the present invention also includes a number of additional features which promotes the smooth operation of the device. In particular, the inner edge of each movement imparting bar is tapered as shown at 48 to provide a smooth transfer of contact between the movement imparting bars of the drive wheel and the pegs of the driven wheel. Since the driven wheel has a smaller diameter than the drive wheel, rotatable motion of the driven wheel periodically causes the pegs on this wheel to come in contact with the inner edge of one of the movement imparting bars, when the center axis of these wheels are not aligned. If the inner edge of the support bars were not tapered, the pegs would abut against the flat edge of the bars causing the device to bind. By tapering the inner edge of the bars in this manner, the pegs are capable of being smoothly and easily displaced to thereby ensure the efficient operation of the device.

An additional modification which may be made to further improve the operation of the device is to position the drive and driven wheel adjacent to each other in a non-parallel relationship. In this configuration, the drive wheel and driven wheel would be positioned so that the movement imparting bars of the drive wheel and the movement receiving pegs of the driven wheel are capable of coming into contact with each other only in the area wherein movement is being imparted from the drive wheel to the driven wheel. By limiting the area of contact between the pegs and bars, interference between the pegs and bars would be significantly reduced thereby improving the smooth operation of the device and minimizing the amount of work needed to move the pegs out of engagement with the movement imparting bars. As a result, the operating efficiency of the device would be correspondingly improved.

A further smoothing of the transition from one movement receiving peg to another is accomplished by mounting the movement imparting bars onto the face of the drive wheel in a non-radial position. By mounting the movement imparting bars onto the face of the drive wheel in an offset position as shown in FIG. 2, the movement imparting bars are capable of causing the driven wheel to decelerate during the latter part of the contact cycle. This deceleration allows for a second movement imparting bar to smoothly come in contact with a second movement receiving peg to thereby improve the efficient operation of the device. As mentioned above, the amount of this offset is a function of the size of the body portion of the movement receiving pegs and may be easily and quickly established through a trail and error basis. In establishing the offset configuration, the magnitude of the offset angle is increased until the operation of the device becomes fairly smooth and easy. The magnitude of the offset angle will be greater for pegs having a body portion with a larger diameter and will decrease as the diameter of the pegs decreases.

Figure 7:
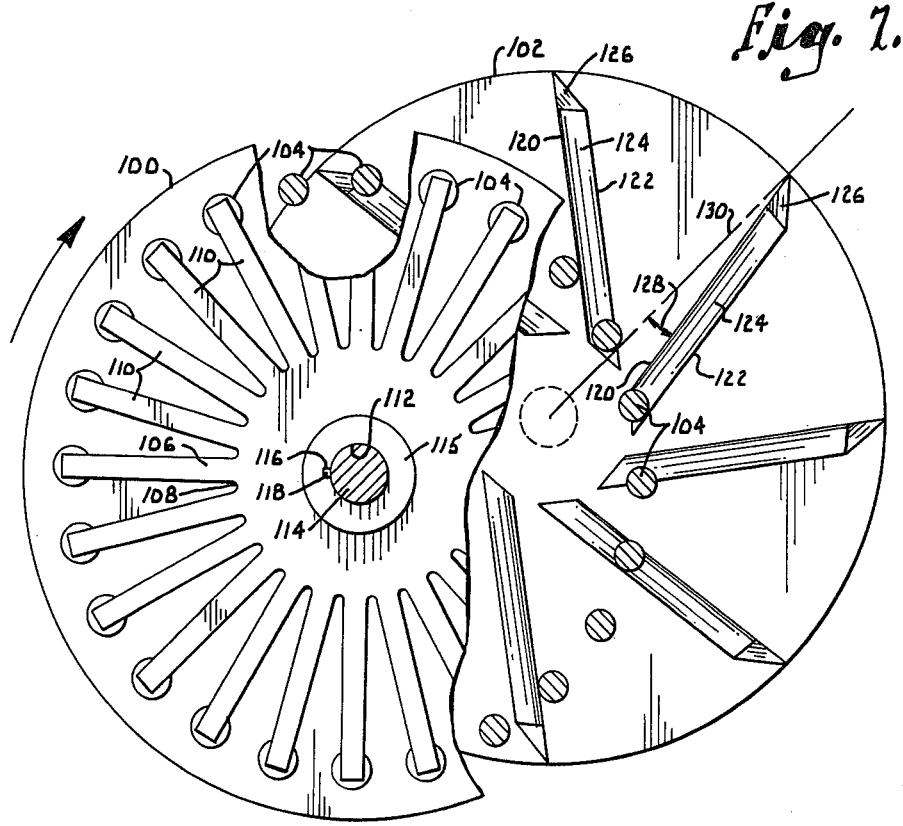
FIG. 7 is a cross-sectional view on an enlarged scale taken generally along line 2—2 of FIG. 1 with portions broken away for the purposes of illustration and showing an alternate embodiment of the transmission device wherein the drive wheel and driven wheel have equal diameters.

A second embodiment of the transmission device is shown in FIG. 7. While the device shown in this figure does not operate quite as smoothly as the one shown in FIGS. 2-6, it provides the added advantage of being operable over a larger range of gear ratios. The overall design and operation of the transmission device shown in FIG. 7 is the same as that of the first embodiment shown in FIGS. 1-6 with some minor exceptions.

The transmission device shown in FIG. 7 is comprised of a circular drive wheel 100 and a circular driven wheel 102 which are positioned adjacent to each other in a generally parallel relationship. Drive wheel 100 has a plurality of movement imparting pegs such as 104 yieldably mounted to it about its outer periphery. These pegs are uniformly spaced about the periphery of the drive wheel and are identical in design and construction to those shown in FIGS. 1-6. In particular, each of the pegs is constructed to have a cylindrically shaped body portion and an enlarged head portion with a rounded upper surface. The pegs are mounted in holes in the drive wheel as described above with respect to FIGS. 3 and 4 and are maintained in a protruding position by means of a biasing means 106 having a central hub portion 108 and a plurality of extending arms such as 110. Biasing means 106 is provided with a center hole 112 to mount the biasing means to the drive shaft 114 by means of a mounting collar 115. The biasing means is keyed to the drive shaft by means of a notch 116 in the inner surface of the hole 112 and a spline 118 which is attached to the drive shaft.

The driven wheel, on the other hand, has a plurality of movement receiving bars mounted on the face thereof in a generally radial configuration. These bars are identical in design and construction to those shown and described with respect to FIGS. 1–6. In particular, the movement receiving bars are constructed to have a trapezoidal cross section with a peg engaging lateral surface 120, a lateral side surface 122 and an inclined face 124. The outer ends of the movement receiving bars are tapered at 126 to facilitate smooth interaction between these bars and the movement imparting pegs. As shown in FIG. 6, the movement receiving bars like the movement imparting bars shown in FIG. 2 are not mounted onto the face of the driven wheel in a perfectly radial position but rather are off set from a radial position a slight amount to thereby provide a smooth interaction between the bars and the movement imparting pegs. The bars are mounted onto the face of the driven wheel such that the engaging lateral surface of each bar forms an off set angle 128 with an imaginery radial line 130 which extends from the center of the driven wheel to the outer edge of the engaging lateral surface. The extent of this off set is a function of the size of the body portion of the movement imparting pegs and may be conveniently determined through a trial and error basis.

In this embodiment of the invention, the drive wheel is positioned adjacent to the driven wheel such that the movement imparting pegs of the drive wheel are capable of physically engaging the movement receiving bars of the driven wheel to transfer the rotary motion of the drive wheel to the driven wheel. The gear ratio between the input shaft attached to the drive wheel and the output shaft attached to the driven wheel is in turn determined by the position of the driven wheel relative to the drive wheel, the gear ratio between the input and output shafts is in turn correspondingly changed.

When the center axis of the drive wheel is aligned with the center axis of the driven wheel, the device is operating in a 1:1 gear ratio. In this position, each of the movement receiving bars is in contact with a movement imparting peg to thereby cause the driven wheel to move in unison with the drive wheel.

When the center axis of the drive wheel is not colinear with the center axis of the driven wheel, the affective radius of the driven wheel is reduced thereby causing the output shaft to move faster than the input shaft. In this configuration, a first movement imparting peg comes in contact with a first movement receiving bar to thereby initiate a contact cycle. While this peg is in contact with the movement receiving bar, the rotational movement of the driven wheel is physically transferred to the driven wheel by means of the intimate contact between the peg and bar. As the wheels move through the contact cycle, the driven wheel begins to decelerate near the end of the contact cycle thereby allowing a second movement imparting peg to come into contact with a second movement receiving bar. Since the second movement imparting peg is now moving the drive wheel at a faster rate of speed than the first movement imparting peg, contact between the first movement imparting peg and the first movement receiving bar is broken thereby initiating a second contact cycle. Thereafter, the movement of the drive wheel is imparted to the driven wheel by the second drive peg and so on.

To allow for the smooth operation of the device, the movement imparting pegs are yieldably mounted to the driven wheel. In addition, the outer edge of each bar is tapered to allow for a smooth interaction between the movement imparting pegs and the movement receiving bars. It should be noted, however, that this embodiment of the device does not operate as smoothly as the embodiment shown in FIGS. 1–6. This embodiment of the device, however, is capable of producing a larger range of gear ratios.

Figure 8:
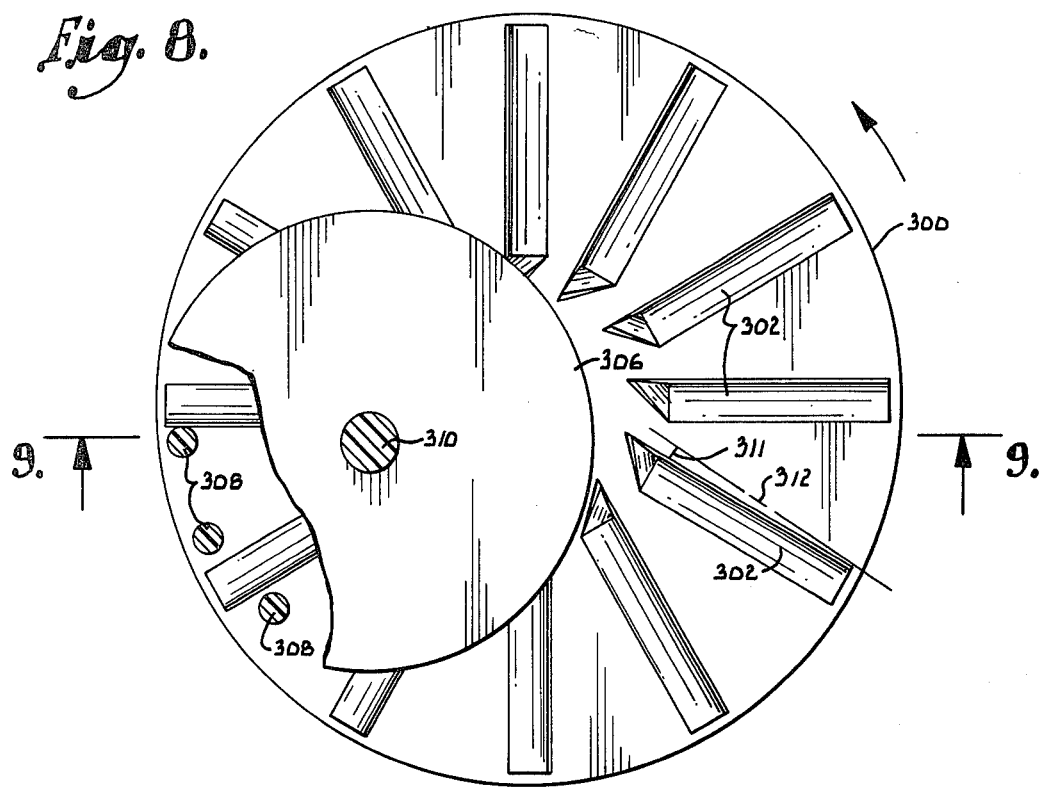
FIG. 8 is a cross-sectional view on an enlarged scale taken generally along lines 2—2 of FIG. 1 with portions broken away for the purposes of illustration and showing an alternate embodiment of the present invention.
Figure 9:
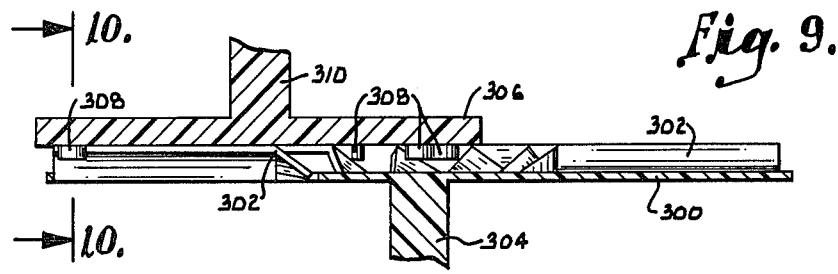
FIG. 9 is a cross-sectional view taken generally along line 9—9 of FIG. 8 in the direction of the arrows.
Figure 10:
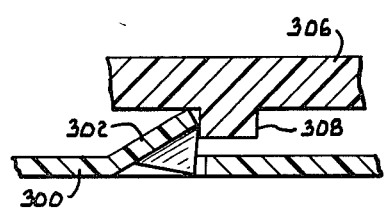
FIG. 10 is a sectional view on an enlarged scale taken generally along line 10—10 of FIG. 9 in the direction of the arrows.

A third embodiment of the device is shown in FIGS. 8–10. The device shown in these figures is comprised of a circular drive wheel 300 having a plurality of movement imparting flaps such as 302 yieldably formed in the face thereof. In this embodiment of the device, the drive wheel is constructed of molded plastic which is formed such that the flaps protrude outward from the face of the wheel. The flaps are integrally formed with the face of the drive wheel and bend outward therefrom in a flexible construction. As a result, the flaps are of a yieldable construction and may be moved out of the way in response to a force applied to them. The drive wheel has a drive shaft 304 fixedly secured to it at its center axis. The drive shaft is in turn coupled with a prime move (not shown) to impart rotational movement to the drive wheel.

This device also includes a circular driven wheel 306 having a plurality of movement receiving pegs such as 308 integrally formed therewith. The pegs are uniformly spaced about the outer periphery of the wheel and protrude outward from the face of the wheel at a right angle therewith. A driven shaft 310 is in turn attached to the driven wheel at its center axis.

Accordingly, the transmission device shown in FIS. 8–10 is basically the same in design and operation as the device shown in FIGS. 1–6 with the exception that the movement receiving pegs are rigidly fixed to the driven wheel and the movement imparting flaps are yieldably attached to the drive wheel.

In this configuration, the device operates in substantially the same manner as described above with respect to FIGS. 1–6. When the device is in a 1:1 gear ratio, the center axis of the drive wheel is aligned with the center axis of the driven wheel and each movement imparting flap is in contact with a movement receiving peg. When the center axis of the driven wheel is not aligned with the center axis of the drive wheel, the effective radius of the driven wheel is changed thereby producing a corresponding change in the gear ratio. In this position, a first movement imparting flap comes in contact with a first movement receiving peg during the start of the contact cycle. During the course of the contact cycle, the first movement imparting flap remains in contact with the first movement receiving peg to physically transfer the rotary movement of the drive wheel to the driven wheel. Toward the end of the contact cycle, the driven wheel begins to decelerate thereby allowing a second movement imparting flap to come in contact with a second movement receiving peg. Since the second movement imparting flap is now moving the drive wheel at a faster rate of speed than the first movement imparting flap, contact between the first movement imparting flap and the first movement receiving peg is broken thereby initiating a second contact cycle. Thereafter, the rotary motion of the drive wheel is transferred to the driven wheel by means of the second movement imparting flap.

As shown in FIG. 8, the movement imparting flaps, like the movement imparting bars shown in FIG. 2, are not mounted onto the face of the driven wheel in a perfectly radial position but rather are off set from a radial position a slight amount to thereby provide a smoother interaction between the bars and the movement imparting pegs. The bars are mounted onto the face of the driven wheel such that the engaging lateral surface of each bar forms an off set angle 311 with an imaginary radial line 312 which extends from the center of the driven wheel to the outer edge of the enaging lateral surface. The extent of this off set is a function of the size of the body portion of the movement imparting pegs and may be conveniently determined by trial and error.

From the foregoing, it will be seen that this invention is one well adapted to attain all the ends and objects herein above set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A variable speed transmission device comprising:
   a first wheel having a front surface carrying a plurality of bars thereon;
   a second wheel having a front surface spaced from and facing the front surface of said first wheel, said second wheel having a plurality of openings therein arranged in a circular configuration about the center of the second wheel;
   a plurality of pegs in the respective openings projecting beyond said front surface of the second wheel to interact with said bars in a manner to transfer rotation of one wheel into rotation of the other wheel; and
   a generally flat spring member on said second wheel having a hub portion and a plurality of extending spring arms contacting the respective pegs in a manner to yieldably urge the pegs generally toward the first wheel to bias the pegs toward the bars.

2. A variable speed transmission device comprising:
   a first wheel having a front surface carrying a plurality of generally radially oriented bars thereon;
   a second wheel having a planar front surface spaced from and facing the front surface of said first wheel;
   a plurality of pegs;
   means for mounting said pegs in projection from said front surface of the first wheel in a circular configuration about the center of the first wheel to interact with said bars in a manner to translate rotation of one wheel into rotation of the other wheel, said mounting means holding said pegs against movement relative to said front surface of the second wheel parallel to said front surface thereof and permitting axial extension and retraction of said pegs in a direction perpendicular to the front surface of said second wheel;
   means for yieldably biasing said pegs to extend toward said front surface of the first wheel; and
   means for supporting said wheels with the front surfaces thereof in facing relation and in a manner permitting generally lateral movement of the wheels relative to one another to vary the transmission ratio.

3. A transmission device as set forth in claim 2, including means for mounting each peg in the corresponding opening in a manner permitting rotation of each peg about its longitudinal axis.

4. A transmission device as set forth in claim 2, wherein each bar includes a first generally flat surface for engagement with the pegs, a second generally flat surface opposite the first surface, and an inclined surface extending between said first and second surfaces, said inclined surface being closer to said front surface of the first wheel at a location adjacent said second surface than at a location adjacent said first surface to permit the pegs to ride along said inclined surface from said second surface to said first surface.

5. A transmisson device as set forth in claim 2, wherein each bar includes a substantially flat, planar surface for engaging the pegs, each planar surface being offset from a radius line of the first wheel.

6. A transmission device as set forth in claim 2, wherein said planar surface of each bar has outer and inner ends, said outer end of each bar being in a leading position relative to the inner end of the bar as said first wheel rotates.

7. A variable speed transmission device comprising:
   a first wheel having a front surface carrying a plurality of projecting pegs arranged in a circular configuration about the center of the first wheel;
   a second wheel having a front surface carrying a plurality of generally radially oriented bars thereon, each bar having a surface thereon operable to interact with the pegs in a manner to transmit rotation of one wheel into rotation of the other wheel;
   means for mounting said first and second wheels with said front surfaces thereof spaced apart and facing one another to effect interaction between said pegs and bars, said mounting means permitting relative lateral movement of said first and second wheels to vary the relative rotational speeds of the wheels; and
   said bars and pegs being arranged to permit interaction between each peg and each bar as the wheels rotate.

8. A variable speed transmission device comprising:
   a first wheel having a front surface carrying a plurality of projecting pegs arranged in a circular configuration about the center of the first wheel, each peg being rigidly connected with said front surface;
   a second wheel having a front surface carrying a plurality of flexible flaps projecting therefrom for interaction with said pegs, each flap having an edge operable to interact with said pegs to transmit rotation of one wheel into rotation of the other wheel and an inclined surface adapted to be contacted by the pegs to flex the flap toward said front surface of the second wheel to permit the pegs to pass the flaps; and
   means for mounting said first and second wheels with said front surfaces spaced apart and facing one another and in a manner permitting generally lateral movement of the wheels relative to one another to vary the relative rotational speed of the wheels.

* * * * *